United States Patent
Grimaud et al.

(10) Patent No.: US 9,824,601 B2
(45) Date of Patent: Nov. 21, 2017

(54) SYMBIOTIC HELPER

(75) Inventors: Jean-Jacques Grimaud, Winchester, MA (US); Garth Edward Coleman, Berlin, MA (US)

(73) Assignee: Dassault Systemes, Velizy Villacoublay (FR)

( * ) Notice: Subject to any disclaimer, the term of this patent is extended or adjusted under 35 U.S.C. 154(b) by 238 days.

(21) Appl. No.: 13/494,223

(22) Filed: Jun. 12, 2012

(65) Prior Publication Data
US 2013/0330705 A1    Dec. 12, 2013

(51) Int. Cl.
G09B 5/00    (2006.01)

(52) U.S. Cl.
CPC ..................... G09B 5/00 (2013.01)

(58) Field of Classification Search
CPC ........................................... G09B 19/00
USPC .......................................... 434/365; 351/158
See application file for complete search history.

(56) References Cited

U.S. PATENT DOCUMENTS

| | | | |
|---|---|---|---|
| 6,175,803 B1 * | 1/2001 | Chowanic et al. | 701/533 |
| 7,042,345 B2 * | 5/2006 | Ellis | 340/436 |
| 7,343,328 B1 | 3/2008 | Smith et al. | |
| 7,685,023 B1 | 3/2010 | Abraham et al. | |
| 8,049,621 B1 | 11/2011 | Egan | |
| 8,941,645 B2 | 1/2015 | Grimaud | |
| 2002/0044152 A1 | 4/2002 | Abbott, III | |
| 2004/0145496 A1 | 7/2004 | Ellis | |
| 2005/0096933 A1 * | 5/2005 | Collins et al. | 705/1 |
| 2006/0175403 A1 | 8/2006 | Fossen McConnell | |
| 2007/0179867 A1 | 8/2007 | Glazer | |
| 2009/0063307 A1 | 3/2009 | Groenovelt et al. | |
| 2009/0138113 A1 | 5/2009 | Hoguet | |

(Continued)

FOREIGN PATENT DOCUMENTS

| | | |
|---|---|---|
| JP | 11-272647 | 10/1999 |
| JP | 2001-117046 | 4/2001 |

(Continued)

OTHER PUBLICATIONS

E-semble/XVR, Mar. 6, 2012, (http://www.e-semble.com/en/Products/WVR/In_general).*

(Continued)

*Primary Examiner* — Thomas Hong
(74) *Attorney, Agent, or Firm* — Hamilton, Brook, Smith & Reynolds, P.C.

(57) ABSTRACT

In one embodiment, a computer-based method includes detecting a state of a user and detecting a stimulus in an environment of the user. The computer-based method then provides a variable level of assistance to the user based on the detected state of the user and the detected stimulus in the environment. In another embodiment, detecting the stimulus in the environment of the user may include detecting a visual stimulus, an auditory stimulus, a physical stimulus, a vibratory stimulus, an electro-magnetic stimulus, an olfactory stimulus, a temperature stimulus, or a movement stimulus. Detecting the state of the user may include detecting natural language spoken by the user. The resulting variable level of assistance utilizes a range of immersive virtual reality, augmented reality and sparsely augmented reality. 3D models of the user's situation (the environment) may be employed in the variable levels of assistance.

25 Claims, 11 Drawing Sheets

(56) References Cited

U.S. PATENT DOCUMENTS

| | | |
|---|---|---|
| 2009/0201288 A1 | 8/2009 | Fischer et al. |
| 2010/0076959 A1 | 3/2010 | Ramani et al. |
| 2010/0161400 A1 | 6/2010 | Snodgrass |
| 2010/0171826 A1 | 7/2010 | Hamilton et al. |
| 2011/0029382 A1 | 2/2011 | Narasimhan |
| 2011/0115909 A1 | 5/2011 | Sternberg et al. |
| 2011/0214082 A1 | 9/2011 | Osterhout |
| 2012/0284145 A1 | 11/2012 | Kalin |
| 2012/0303477 A1 | 11/2012 | Ben-Itzhak |
| 2012/0330781 A1 | 12/2012 | Borrero |
| 2013/0041778 A1 | 2/2013 | Nativ |
| 2013/0268392 A1 | 10/2013 | Chatcau-Artaud |
| 2013/0300729 A1 | 11/2013 | Grimaud |
| 2013/0335573 A1 | 12/2013 | Forutanpour |
| 2014/0379524 A1 | 12/2014 | Grimaud et al. |

FOREIGN PATENT DOCUMENTS

| | | |
|---|---|---|
| JP | 2001-331216 | 11/2001 |
| JP | 2001-344352 | 12/2001 |
| JP | 2002-366021 | 12/2002 |
| JP | 2003-178131 | 6/2003 |
| JP | 2005-315802 | 11/2005 |
| JP | 2010-197153 | 9/2010 |
| WO | WO 2000/03329 | 1/2000 |

OTHER PUBLICATIONS

Halal, A., Moore, S.E., Ramachandran, B. / Drishti: An Intergrated Navigation System for Visually Impaired and Disabled / 2001. Proceedings. Fifth International Symposium on Wearable Computers.*

Doswell, J.T., The Justopia Group / Augmented Learing: Context-Aware MobileAugmented Reality Architecture for Learning / 2006. Sixth International Conference on Advanced Learning Technologies.*

Ram, S., Sharf, J, / The People Sensor: A Mobility Aid for the Visually Impaired / 0-8186-9074-7/98 (p. 166-167) / 1998 IEEE.*

European Search Report for EP 09 30 6355 dated Apr. 22, 2010.

Noort, A., et al. "Integrating Part and Assembly Modelling", Computer-Aided Design, 34:12, pp. 899-912, Oct. 1, 2002.

Finger, S., et al. "A Transformational Approach to Mechanical Design Using a Bond Graph Grammar", American Society of Mechanical Engineers, Design Engineering Division, vol. 17, pp. 107-116, 1989.

Molli, P., et al. "Using the Transformational Approach to Build a Safe and Generic Data Synchronizer", Proceedings to the International ACM Siggroup Conference Supporting Group-Work—Group '03: Proceedings of the 2003 Association for Computing Machinery, US, pp. 212-220, 2003.

European Search Report for EP 14 16 8670 dated Jul. 1, 2014.

Daniel, B. H., et al., "Student-Sensitive Multimodal Explanation Generation for 3D Learning Environments", from *American Association of Artificial Intelligence Proceedings*, 7 pages (1999).

Everett, S S., et al., "A Natural Language Interface for Virtual Reality Systems", Navy Center for Artificial Intelligence, 2 pages.

Graesser, A. C., et al., "Teaching Tactics and Dialog in AutoTutor", *International Journal of Artificial Intelligence in Education* (2001).

Miller, George A., "The Magical Number Seven, Plus or Minus Two Some Limits on Our Capacity for Processing Information", *Psychological Review*, 101(2): 343-352.

Sowa, T. and Wachsmuth, I., "Understanding Coverbal Dimensional Gestures in a Virtual Design Environment", Paper presented at ESCA Workshop on Interactive Dialogue in Multi-Modal Systems (IDS-99), Kloster Irsee, Germany (Jun. 22-25, 1999).

Wankat, P. C. and Oreovicz, F. S., "Chapter 14: Models of Cognitive Development: Piaget and Perry", In *Teaching Engineering*, (NY: McGraw-Hill), pp. 264-283 (1993).

European Search Report dated Oct. 22, 2013 in European Application No. EP 13 17 1488, 3 pages.

* cited by examiner

SYMBIOTIC HELPER

BACKGROUND OF THE INVENTION

Training users to use machines or perform activities typically is performed by using an actual machine or a training environment. Specific machines can also be designed to be used only for training purposes for a specific context. Further, a specific environment can be designed to train a user in an activity.

SUMMARY OF THE INVENTION

In one embodiment, a computer-based method includes detecting a state of a user and detecting a stimulus in an environment of the user. The computer-based method then provides a variable level of assistance to the user based on the detected state of the user and the detected stimulus in the environment.

In another embodiment, detecting the stimulus in the environment of the user may include detecting a visual stimulus, an auditory stimulus, a physical stimulus, a vibratory stimulus, an electro-magnetic stimulus, an olfactory stimulus, a temperature stimulus, or a movement stimulus. Detecting the state of the user may include detecting natural language spoken by the user.

In one embodiment, the computer-based method includes determining a level of skill of the user. The computer-based method also includes adjusting the variable level of assistance based on the determined level of skill (e.g., of the user).

In another embodiment, providing a variable level of assistance includes providing an immersive virtual reality at a display for a first level of assistance, providing an augmented virtual reality for a second level of assistance, and providing a sparsely augmented reality for a third level of assistance. The computer-based method may further alert the user to the detected stimulus in the environment in the immersive virtual reality, augmented virtual reality, or sparsely augmented reality.

In one embodiment, the computer-based method may further provide a variable level of assistance by training the user to require a lower level of assistance. Providing a variable level of assistance to the user may include providing personal safety training or team safety training.

In one embodiment, the computer-based method may include alerting the user to positive and negative inferences determined from the detected stimulus. A positive inference is an inference of an event or status from a change in environmental or user stimulus or circumstances, for example. A negative interference is an inference of an event or status from a lack of a change in environmental or user stimulus or circumstances, for example.

In one embodiment, the computer-based method may provide to the user instructions based on a risk assessment of the detected environment.

In one embodiment, the computer-based method may also identify an abnormality in the detected stimulus. The computer-based method may also determine supplemental information about the abnormality. The computer-based method may then alert the user of the presence of the abnormality and the determined supplemental information.

In another embodiment, a system can include a user state detection module configured to detect a state of a user. The system may also include an environment stimulus detection module configured to detect a stimulus in an environment of the user. The system may further include an assistance module configured to provide a variable level of assistance to the user based on the detected state of the user and the detected stimulus in the environment.

In another embodiment, an apparatus can include a memory area configured to store preset levels of assistance to a user. The apparatus may further include a processor coupled to said memory area. The processor may be configured to detect a state of a user and detect a stimulus in an environment of the user. The processor may be further configured to provide at least one of the preset levels of assistance to the user based on the detected state of the user and the detected stimulus in the environment. The apparatus may further include a wearable module including at least one of a display and a speaker configured to provide the at least one of the preset levels of assistance to the user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
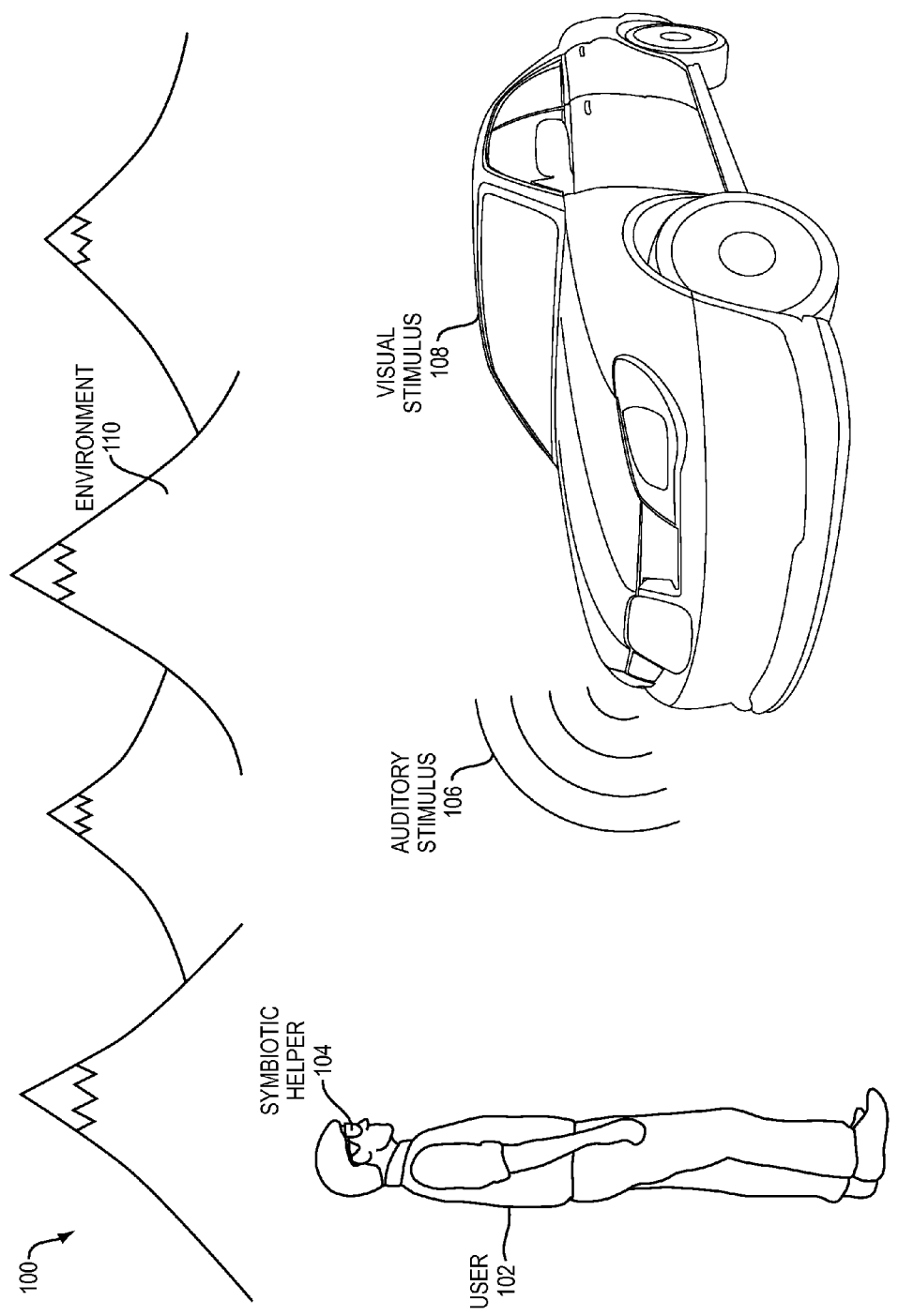
FIG. 1 is a diagram of a user using a symbiotic helper in an environment according to principles of the present invention.

FIG. 1 is a diagram 100 of a user 102 using a symbiotic helper 104 in an environment 110. The symbiotic helper 104 assists the user 102 by providing a virtual reality environment to the user 102. The symbiotic helper 104 can provide different levels of virtual-reality to the user 102. The symbiotic helper 104 can provide an immersive virtual reality (or an immersive reality) to the user 102. The immersive virtual reality provides the user with a complete virtual reality environment unrelated to the real world environment 110. For example, an immersive virtual reality can be a training simulation which provides the user with a valuable training experience without jeopardizing the safety of the user. The symbiotic helper, by employing the immersive virtual reality, shields the user from traditional risks (e.g., physical injury, damage to property, etc.) associated with the real world environment 110.

The symbiotic helper 104 can also provide an augmented reality (or augmented virtual reality) to the user 102. The augmented reality can provide the user 102 with a representation of the environment 110 which can overlay important information. For example, the symbiotic helper 104 can display the representation of the environment 110 with overlaid instructions on how to use a particular machine or set of machinery. As another example, the symbiotic helper 104 can display the representation of the environment 110 with overlaid instructions based on a GPS locator to provide directions to the user. The symbiotic helper 104 can determine the level of skill of the user, and display skill level appropriate instructions. For example, the symbiotic helper 104 can display basic, or more detailed, instructions to a user 102 with a low level of training, and more advanced, or higher level, instructions for more advanced or complicated tasks to a user 102 with a higher level of training. In addition, the symbiotic helper 104 can walk the user 102 with a low level of training through a complicated task by providing detailed and step-by-step instructions. The symbiotic helper 104 can assist the user 102 with a high level of training through the same task by providing less intrusive and less detailed reminders of the process.

The symbiotic helper 104 provides training to the user 102 so that the user 102 later requires less training. For example, the symbiotic helper 104 can provide training to the user 102 such that the symbiotic helper 104 can provide a lower level of assistance (e.g., a less instructive level of training) in a next training session. This can train the user to become independent from the symbiotic helper's 104 assistance.

The symbiotic helper 104 can also provide a sparsely augmented reality (or sparsely augmented virtual reality) to the user 102. The sparsely augmented reality displays a representation of the environment 110 with representations of notifications, or alerts, of stimulus that require the user's 102 attention (e.g., immediate attention). For example, within the environment 110, the user 102 may be in proximity to perceive either a visual stimulus 108 and/or an auditory stimulus 106. FIG. 1 illustrates the visual stimulus 108 as an automobile and the auditory stimulus 106 as a sound emitted from an automobile, however, a person of ordinary skill in the art can recognize that the visual stimulus 108 and auditory stimulus 106 can be any stimulus created within the environment 110. The user 102 may be in proximity to either a visual stimulus 108 or an auditory stimulus 106 that is below a threshold of human perception, however, is above a threshold of perception of a machine such as the symbiotic helper 104. The symbiotic helper 104 can detect the visual stimulus 108 and the auditory stimulus 106, by utilizing cameras and microphones coupled with a processor configured to detect visual and audio stimulus. The symbiotic helper 104 may likewise employ motion sensors, heat sensors, light sensors and the like.

The symbiotic helper 104 can generate notifications to the user of the visual stimulus 108 and the auditory stimulus 106. An example notification can be an alert, such as an audio notification, where the symbiotic helper 104 speaks to the user 102 to inform the user 102 of the stimulus using natural language or code, or a visual notification overlaid on the representation of the environment 110. For example, the visual notification can be a language message that the user reads, or a representation of the environment 110 with the particular stimulus highlighted, for example by surrounding the stimulus with a brightly colored or attention grabbing box or shape, or by dimming the rest of the environment 110 while leaving the stimulus relatively brightly illuminated. A person of ordinary skill in the art should recognize that the symbiotic helper 104 can employ any one or combination of methods to direct the user's attention to a particular stimulus either by visual means or by auditory means.

Figure 2:
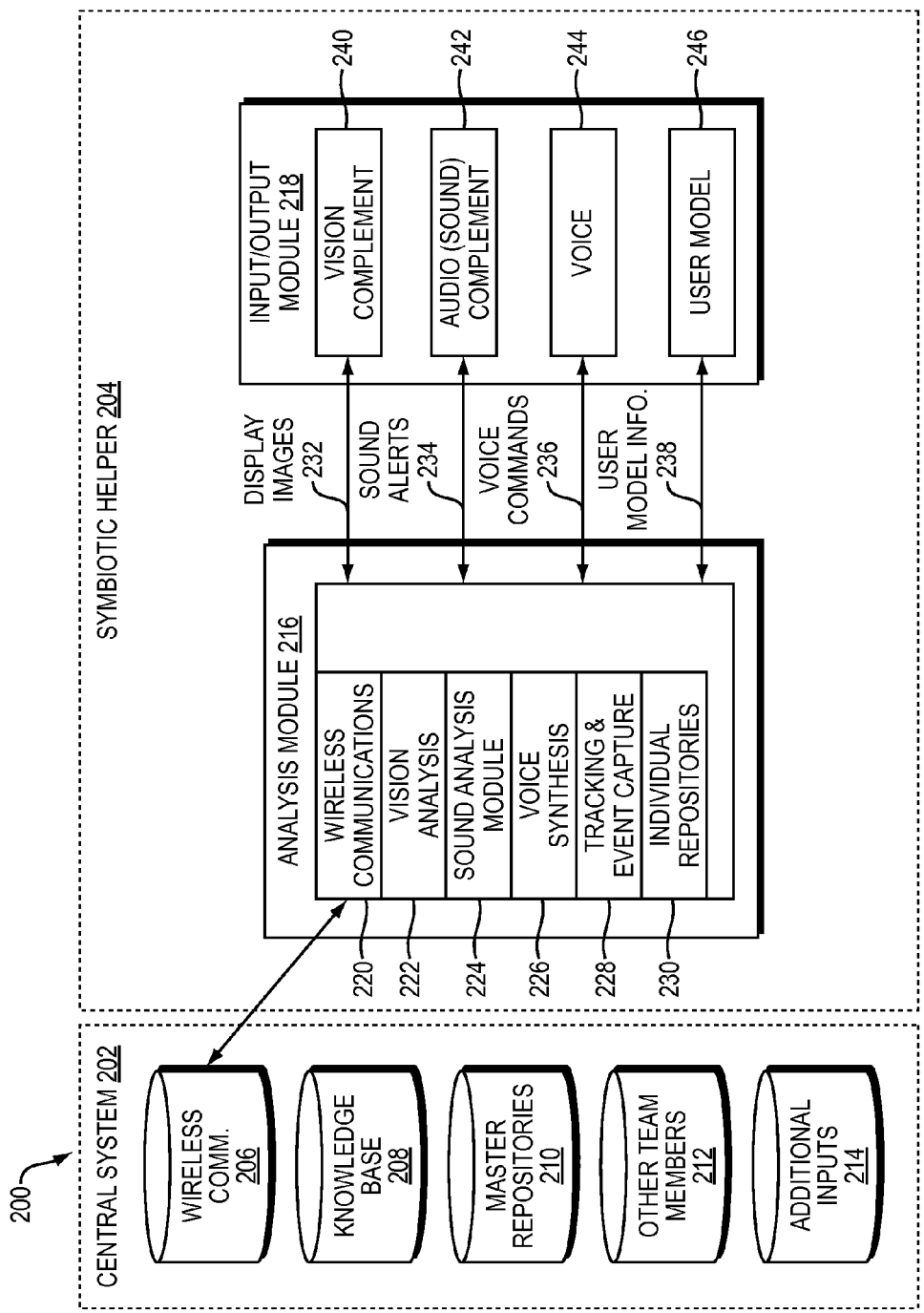
FIG. 2 is a block diagram of an example embodiment of the symbiotic helper employed to communicate with a central system.

FIG. 2 is a block diagram of an example embodiment 200 of the symbiotic helper 204 employed to communicate with a central system 202. The central system 202 includes a wireless communications module 206 which is coupled to communicate with the symbiotic helper 204 by exchanging information from a knowledge base 208, one or more master repositories 210, an other team members module 212, and an additional inputs module 214. Further, the wireless communications module 206 is configured to receive, from the symbiotic helper 204, detected information from the environment, such as visual information, auditory information, olfactory information, or any other information the symbiotic helper 204 is configured to record or collect.

The knowledge base 208 includes knowledge of various activities the symbiotic helper 204 is configured to assist its user with. For example the knowledge base 208 can include data that corresponds to various stimulus. The knowledge base 208 can include models of various auditory or visual information that the symbiotic helper 204 can detect in its environment and notify the user of the presence of the stimulus.

The master repositor(ies) 210 are knowledge base(s) that are specific to a language or a culture. In one embodiment, the master repositories 210 can bridge knowledge of languages and cultures. The master repositories 210 contain content and relationships.

A concept, as described herein, includes types of objects (such as products, computers, diseases, companies, and tools) and types of activities (such as clipping toe nails, taking a trip, executing a diagnostic procedure, and manufacturing a pharmaceutical product).

Relationships, as described herein, link concepts together. A relationship can be a taxonomic relationship (e.g., a sub-type, sub-class or instance of a concept), partonomic relationship (e.g., a concept that is part of a device, of an organization, or an event), a geospatial relationship (e.g., proximity of concepts, contact of instances of concepts, adjacency of concepts, or relative location of concepts) a tool and/or resource relationship (e.g, a 3-inch ball bearing linked to a slidehammer with a ball-bearing extractor for 2.5 inch to 3.5 inch) and a temporal relationship (e.g, before, after, simultaneous, coexisting).

The master repositories 210 are the aggregation of many elementary and complex concepts and relationships. The concepts and relationships are enriched with each domain specific instructional intent. The master repository 210 has two goals. First, the master repository 210 addresses what is generally seen as "common sense" in the specific culture and language. Second, the master repository 210 adds new associated concepts and relationships specific to instructional intent of a new training 3D experience of a specific domain.

Upon adding domain specific training to the master repository 210, the 3D (and 2D) representations associated with the concepts of the domain specific training are added to the master repository 210. In parallel, the environment (and its component features) for which the domain specific training is being authored, is added to the master repository 210. The master repositories 210 can be expanded by processing, searching, and/or indexing external repositories containing additional facts and definitions (such as Wikipedia).

The symbiotic helper 104 uses the master repository, built on concepts and relationships, with formal logic to determine a Boolean conclusion on any of a large number of assertions (facts and rules). The symbiotic helper 104 employing the master repository 210 can resolve assertions which are either context independent or context dependent. For example, in a frustrum seen by a particular user, Tom, the symbiotic helper 104 employing the master repository can determine "the first vertical red pipe to the left of the orange generator at approximately a two o'clock direction."

The symbiotic helper 104 can resolve such assertions because it can access the training environment, as it has been designed, and the training environment, as it is perceived and interacted with by the trainee. The symbiotic helper 104 may employ image recognition techniques in certain embodiments. The symbiotic helper 104 can select the collection of generators included in the frustrum perceived by Tom by extracting a corresponding volume from a model of the training environment and selecting the generators included in that portion of the model, filter the orange ones, virtually trace a vertical two o'clock plane, select the proper generator (e.g., the orange generator in the two o'clock plane), and incrementally process the environment to the left of the position of the proper generator (e.g., its current position) until it intersects the first vertical red pipe, and select and/or highlight the red pipe.

The symbiotic helper 104 also uses the master repository 210 to make positive and negative inferences from a behavioral standpoint during training for a specific domain. In other words, the symbiotic helper 104 employing the master repository determines whether a behavior from a given set of inputs and conditions is an actual or observed behavior. More complex models or multivariate look-up tables associated with particular domains can be added to the master repository 210 to represent specific complex behavior relationships without having to model the intrinsic variables and equations which generate the behavior.

The other team members module 212 is configured to store information relating to team members employed with other symbiotic helpers, such other team members' location, other team members' status, task(s) assigned to other team members, or other information as assigned by team members or a team leader.

The master repository 210 can extract and store the individual repository (or duplicate thereof) of each individual in the team. The other team members module 210 can include the individual repositories of team members either in whole or in part.

The additional inputs module 214 is configured to receive any other additional input from the symbiotic helper 204, via the wireless communications module 206, and return analysis as necessary to the symbiotic helper 204, via the wireless communications module 206.

The symbiotic helper 204 includes an analysis module 216 and an input/output module 218. The analysis module includes a wireless communications module 220 configured to communicate with the wireless communications module 206 of the central system 202. The analysis module 216 further includes a vision analysis module 222. The vision analysis module 222 is configured to receive visual information, for instance, from a camera, imaging device, or other photo capture device or module, and analyze the features (e.g., stimulus, abnormalities, environment) of the acquired data. The vision analysis module 222 accomplishes this by utilizing the wireless communications module 220 to acquire information in the knowledge base 208, the master repositories 210, the other team members module 212, and/or the additional inputs module 214 in the central system 202. Similarly, a sound analysis module 224 receives sound from a microphone, digital sound receiving module, or digitally through a network, and analyzes the received audio (e.g., audio information). The sound analysis module 224 utilizes information acquired through the wireless communications module 220, from the knowledge base 208, the master repositories 210, the other team members module 212, and/or the additional inputs module 214.

The analysis module 216 further includes a voice synthesis module 226. The voice synthesis module 226 is configured to receive information, for example, from the wireless communications module 220, and synthesize the information into speech which can be spoken to the user of the symbiotic helper 204.

A tracking and event capture module 228 is configured to track events that have been analyzed and recognized by the symbiotic helper 204. The symbiotic helper 204 can recognize patterns in the events by tracking them. By keeping track of events continuously, the tracking and event capture module 228 of the symbiotic helper 204 can recognize positive and negative inferences about the activity and alert the user of those inferences. For example, a user who operates a tire pump coupled with a pressure gauge may not notice that the pressure of the tire is not increasing as the user pumps the tire (when it should be increasing). The symbiotic helper 204 (via the tracking and event capture module 228) can detect the negative inference of the pressure gauge reading not increasing. In turn, the symbiotic helper 204 notifies the user pumping the tire that the pressure is constant and that it should be increasing.

An individual repositories module 230 contains results of the past interactive experiences of the user (i.e., the individual) as he or she is training, the past interactive experiences based on one or several learning method(s) for a specific domain. The individual repositories module 230 can be tied to a specific language and/or culture relating to verbal expressions, facial expressions and gestures within the training experience.

Training and associated 3DExperiences are domain specific and reflect an instructional intent consistent with the knowledge and experience that the trainee should learn. Examples of domain specific experiences are (i) safety related to gas on an oil and gas platform, (ii) computer security on Windows 7, (iii) command and control in an operational environment, (iv) orientation in a mining environment, or (v) diesel engine repair.

Training is typically performed using 3 steps: (1) demonstration, (2) interactive learning, and (3) testing.

(1) During the demonstration phase, the symbiotic helper 104 presents concepts to the trainee, typically using video and/or audio. The trainee can decide to restart/replay the demo or go to the next item in the training if he understands the concepts presented in that specific demo.

(2) During the interactive learning phase of the training, the symbiotic helper presents a problem to solve that is identical or similar to the one(s) presented in the demo to the trainee. Hints may or may not be available for the learning depending on the level of the training and/or user skill.

(3) During the testing phase of the training, the symbiotic helper presents a problem to solve similar to the one(s) from the interactive learning phase and the demo phase.

In one embodiment, the symbiotic helper 104 adds coaching to the three phases of training. Here, the symbiotic helper 104 can complement or replace traditional coaching.

The symbiotic helper 104 captures digital footprints of the trainee during all the phases of training. For example, in the demo phase, a digital footprint can be time spent, number of times the trainee viewed the demo, or which demo the trainee viewed.

As another example, or a digital footprint in the interactive learning phase can be time spent learning, initial mistakes of the trainee, use of hints the trainee viewed, trainee hesitations on paths, misidentification of the nature of an event or the state of an object by the trainee, correct responses by the trainee, or time taken by the trainee to successfully answer or solve the problem.

As yet another example, a digital footprint, in the testing phase, can be correct answers, time spent per response, or a type of error.

The symbiotic helper 104 can employ different methods of learning during a specific training. These methods are not exclusive of one another and can be combined. Five types of methods of learning are generally employed: (1) Imprinting, Enculturation, and Habituation (passive modes), (2) Trial and Error, and Play, (3) Simulation, and Mirror response, (4) Imitation, and Observational, and/or (4) Rote, audio or visual inputs, verbal or designation responses, and combinations. The individual repositories module 230 identifies methods or groups associated with a training related to a domain-specific experience.

The input output module 218 includes a vision complement module 240, an audio complement module 242, a voice module 244, and a user model module 246.

The vision complement module 240 is configured to complement the user's vision with a representation of a virtual reality, a representation of an augmented reality, or a representation of a sparsely augmented reality of the environment. Similarly, the audio complement module 242 is configured to provide the user with the same representations of virtual reality, augmented reality, or sparsely augmented reality as the vision complement module 240. However, the audio complement module 242 provides the user with the representations of virtual reality, augmented reality, or sparsely augmented reality by providing audio to the user, instead of video. The audio complement module 242 receives sound alerts 234 from the analysis module 216 that are played to the user. Likewise, the vision complement module 240 receives display images 232 from the analysis module 216 to display to the user.

The voice module 244 receives voice commands from the user. The voice module 244 transmits the voice commands 236 to the analysis module 216. The analysis module 216 analyzes the voice commands using the sound analysis module 224.

The user model module 246 receives user model information 238 from the analysis module 216. The user model module 246 further is configured to revise the user model information 238 based on actions of the user while using the symbiotic helper 204, and returns the user model information 238 to the analysis module 216.

Figure 3:
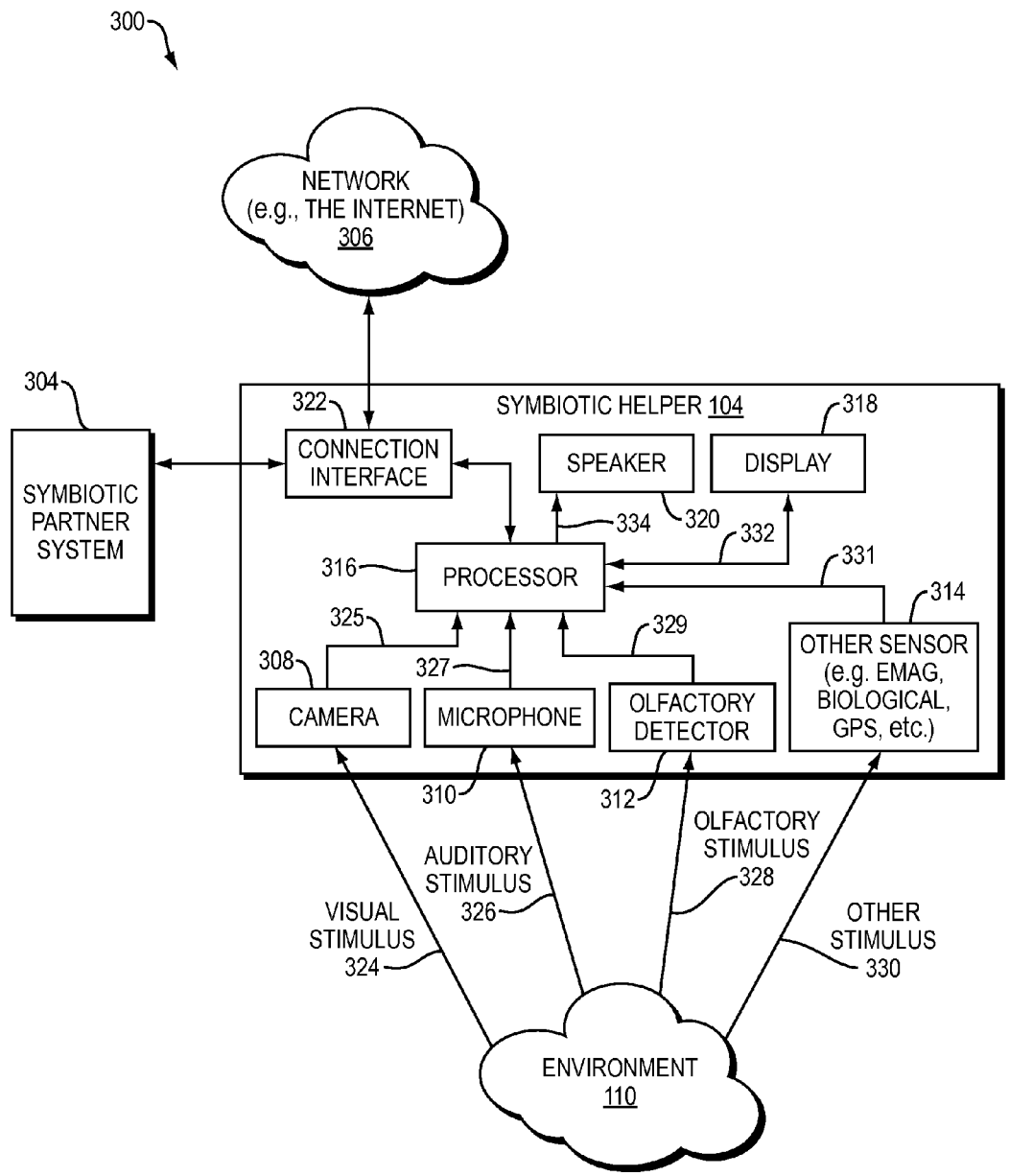
FIG. 3 is a block diagram of an example embodiment of the symbiotic helper employed in the environment with a symbiotic partner system and a network.

FIG. 3 is a block diagram 300 of an example embodiment of the symbiotic helper 104 employed in the environment 110 with a symbiotic partner system 304 and a network 306. The symbiotic helper 104 includes a camera 308, microphone 310, olfactory detector 312, and other sensor 314. The camera 308 is configured to detect visual stimulus 324 of the environment 110. The microphone 310 is configured to detect auditory stimulus 326 of the environment 110. The olfactory detector 312 is configured to detect olfactory stimulus 328, e.g., scents, from the environment 110. The other sensor module 314 is configured to detect other stimulus 330 from the environment 110. The other sensor module 314 is configured to detect any other type of stimulus, for example, temperature, electromagnetic stimulus, biological stimulus, such as vital signs, or global positioning system stimulus. A person of ordinary skill in the art should recognize that the other sensor can detect any stimulus as known in the art.

The processor 316 is configured to receive data 325, 327, 329, 331 indicative of the visual stimulus 324, audio stimulus 326, olfactory stimulus 328 and other stimulus 330 from the camera 308, microphone 310, olfactory detector 312, and the other sensor 314. The processor 316 is configured to analyze the respective stimulus data 325, 327, 329, 331 as generated by the respective detection modules 308, 310, 312, 314, as described in reference to FIG. 2, and to generate virtual reality images 332 and sounds 334 to be rendered in a display module 318 and through speaker 320. The processor 316 can also employ a connection interface 322 coupled with a network 306, for example, the Internet, and the symbiotic partner system 304. The processor 316 can use the network 316 to outsource some of the analysis processing, or to download additional information (data) to assist with analysis (processing) of the stimulus 324, 326, 328, 330 of the environment 110.

Further the processor 316 is configured to communicate with a symbiotic partner system 304. For example, the symbiotic partner system 304 can inform the processor 316 of its own status. For example, if the symbiotic partner system 304 is an automobile, the symbiotic partner system can communicate with the processor 316 additional information about its status. An example of the additional information can include fuel status, tire pressure status, near object detection, fuel status, or any other information that the automobile or any particular symbiotic partner system 304 detects.

Figure 4:
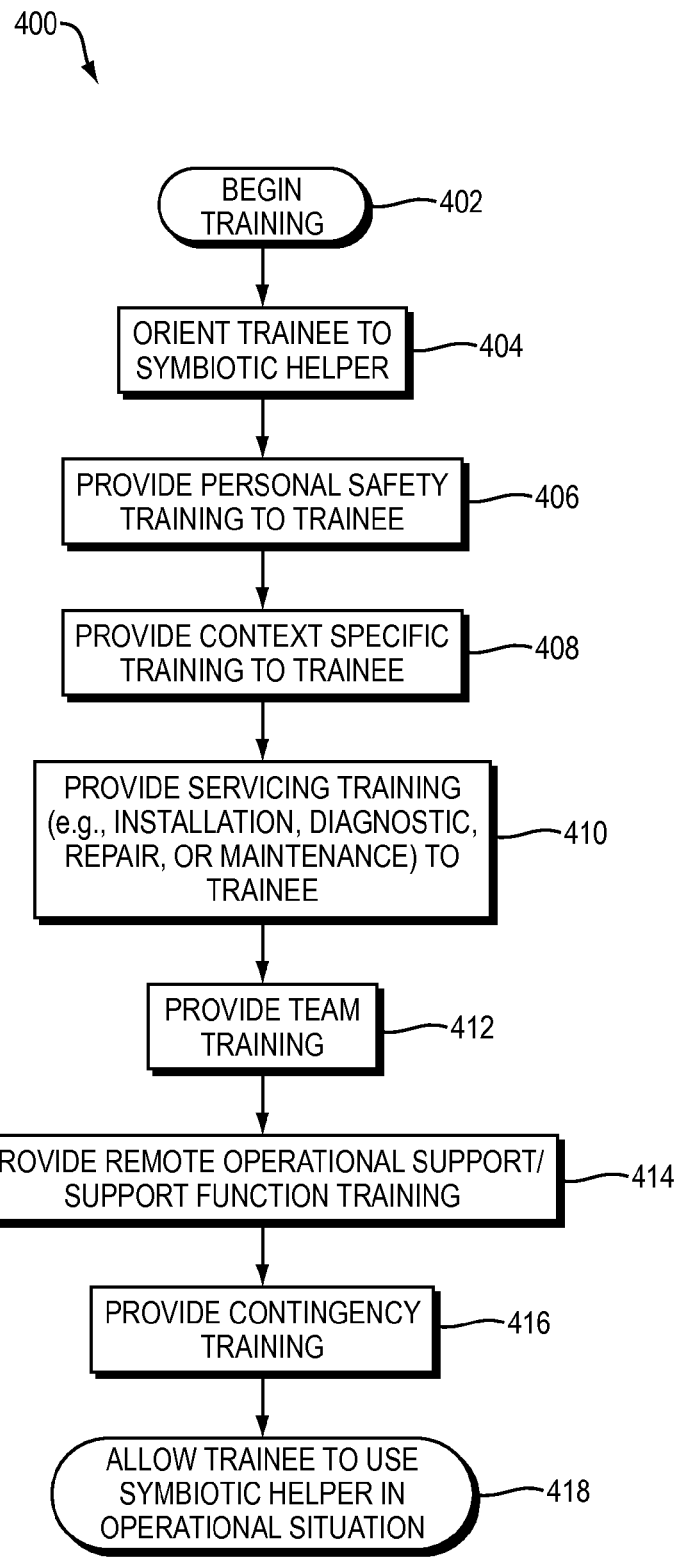
FIG. 4 is a flow diagram of an example embodiment of a training process employed by a symbiotic helper system.

FIG. 4 is a flow diagram of an example embodiment 400 of a training process employed by a symbiotic helper 104 and executed by processor 316. The symbiotic helper system 104 begins training (402). Then, the symbiotic helper 104 orients its trainee to the symbiotic helper (404). The symbiotic helper 104 then provides personal safety training to the trainee (406). For example, the symbiotic helper 104 informs the user of personal safety risks in the particular training activity and provides activities so that the user can avoid those risks in real life. The user is able to repeat the safety training as necessary until, for example, a knowledge threshold is surpassed. This may be measured by points related to questions answered by the user or any other suitable measurement method. Moreover, repetition of the safety training may be automatic or at the user's discretion. Next, the symbiotic helper provides context specific training to the trainee (408). For example, the symbiotic helper 104 can provide training on a specific task. As with the safety training, the user is able to repeat the context specific training as necessary until a knowledge threshold is surpassed. Repetition of the context specific training may be automatic or at the user's discretion.

The symbiotic helper 104 can next provide servicing training to the user (410). For example the symbiotic helper 104 can provide the user, not just with training on how to use a particular machine or system, but also in installing the system, diagnosing problems in the system, repairing the system, or maintaining the system. The user is able to repeat the servicing training as necessary, and as described above, either automatically or at the user's discretion.

The symbiotic helper 104 can then provide the user with team training (412). Team training orients the trainee with working with other members of the team using the symbiotic helper and the object of the training. The symbiotic helper 104 then provides remote operational support or support function training (414). Remote operational support is an example of a remote person or machine providing instructions to the user on how to proceed in a particular situation. Next, the symbiotic helper 104 can provide contingency training to the trainee (416). Contingency training includes providing training for unplanned situations. Again, the user can repeat the team training, the remote operational support or support function training, and/or the contingency training as necessary, either alone or in a group setting. Next, the symbiotic helper 104 ends training by allowing the trainee to use a symbiotic helper 104 in an operational situation (418). The operational situation is a situation that the user has trained for, by the training method outlined above, in the subject matter that the user receives training.

Figure 5:
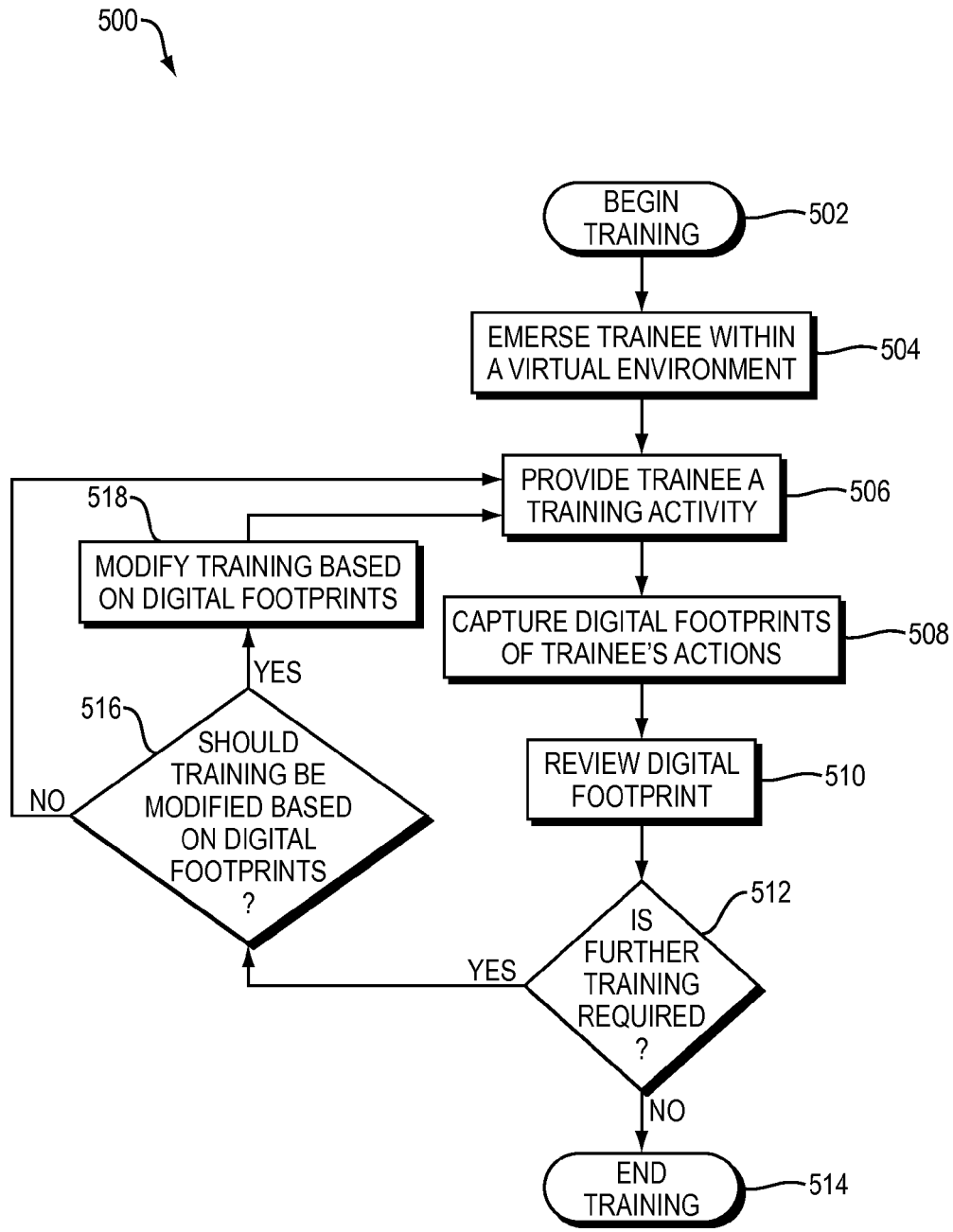
FIG. 5 is a flow diagram of an example embodiment of a process employed by the symbiotic helper.

FIG. 5 is a flow diagram of a process 500 employed by the symbiotic helper 104 and executed by processor 316. The process 500 begins by beginning training (502). Then the symbiotic helper 104 immerses the trainee within a virtual environment (504) by visual display 318 of video image data 332 and generated sounds/audio 334 through speakers 320 (FIG. 3). A virtual environment can be an environment in which the trainee may typically learn a particular activity. For example, the trainee can learn how to drive a particular vehicle by being placed in a virtual environment of the vehicle in a situation where it may be driven. A person of ordinary skill in the art can recognize that other training situations and virtual environments can be implemented in the symbiotic helper.

The system next provides the trainee a training activity (506). The training activity can, for example, be directed towards a particular activity within the virtual environment. For example, if training the trainee to drive the particular vehicle, the training activity can include virtually turning the vehicle on, virtually turning the vehicle off, or virtually driving the vehicle.

The symbiotic helper 104 then captures digital footprints of the trainee's actions in performing the training activity (508). For example, a digital footprint can include a log of the trainee's activities in performing a particular action. The digital footprints can include digital actions performed in the virtual environment, for example, buttons pushed in the vehicle within the virtual environment. The digital footprints can also include broader categories, such as words spoken by the trainee, or movements by the trainee. In one embodiment, a user profile stores digital footprints (e.g., cumulative digital footsteps) and other user characteristics recorded from the user's interaction with the virtual environment (e.g., 3Dexperiences).

After capturing the digital footprints of the trainee's actions (508), the symbiotic helper reviews the captured digital footprints (510). The symbiotic helper 104 reviews the digital footprints to determine the level of proficiency the trainee has acquired at the training activity. For example, if the digital footprint indicates that the trainee very quickly turned the vehicle on (in the virtual sense) correctly, the symbiotic helper can determine that the user is proficient at the training activity. On the other hand, if the digital footprints indicate that the user pushed many wrong buttons and committed various errors before correctly executing a training activity, such as turning the vehicle on, then the system 104 can determine that the user has a low proficiency at the training activity.

Likewise, the symbiotic helper 104 can determine whether further training is required by the level of proficiency of the trainee (512). If the trainee does not require any further training, the training activity ends (514). If further training is required, the symbiotic helper determines whether training should be modified based on the digital footprints (516).

The system determines whether training should be modified based on digital footprints (516) by determining the point of training, through the digital footprints, where the trainee began having difficulty with the training activity. Difficulty with the training activity can be judged by the system by determining the user has veered from the normal course of training steps or by not achieving a desired outcome or checkpoint outcome. If the symbiotic helper 104 determines the training should be modified based on the digital footprints, the system modifies the training based on the digital footprints (518). The system modifies the training based on the digital footprints by using a database of different training techniques, or dynamically rerouting training steps to provide a different path for the training activity that avoids or otherwise prevents the hang up of the user in the digital footprint path. On the other hand, should training not be modified based on the digital footprints, the symbiotic helper 104 provides the trainee the training activity (506). In addition, after modifying training based on the digital footprints (518), the system also provides the trainee with the training activities (506).

Figure 6:
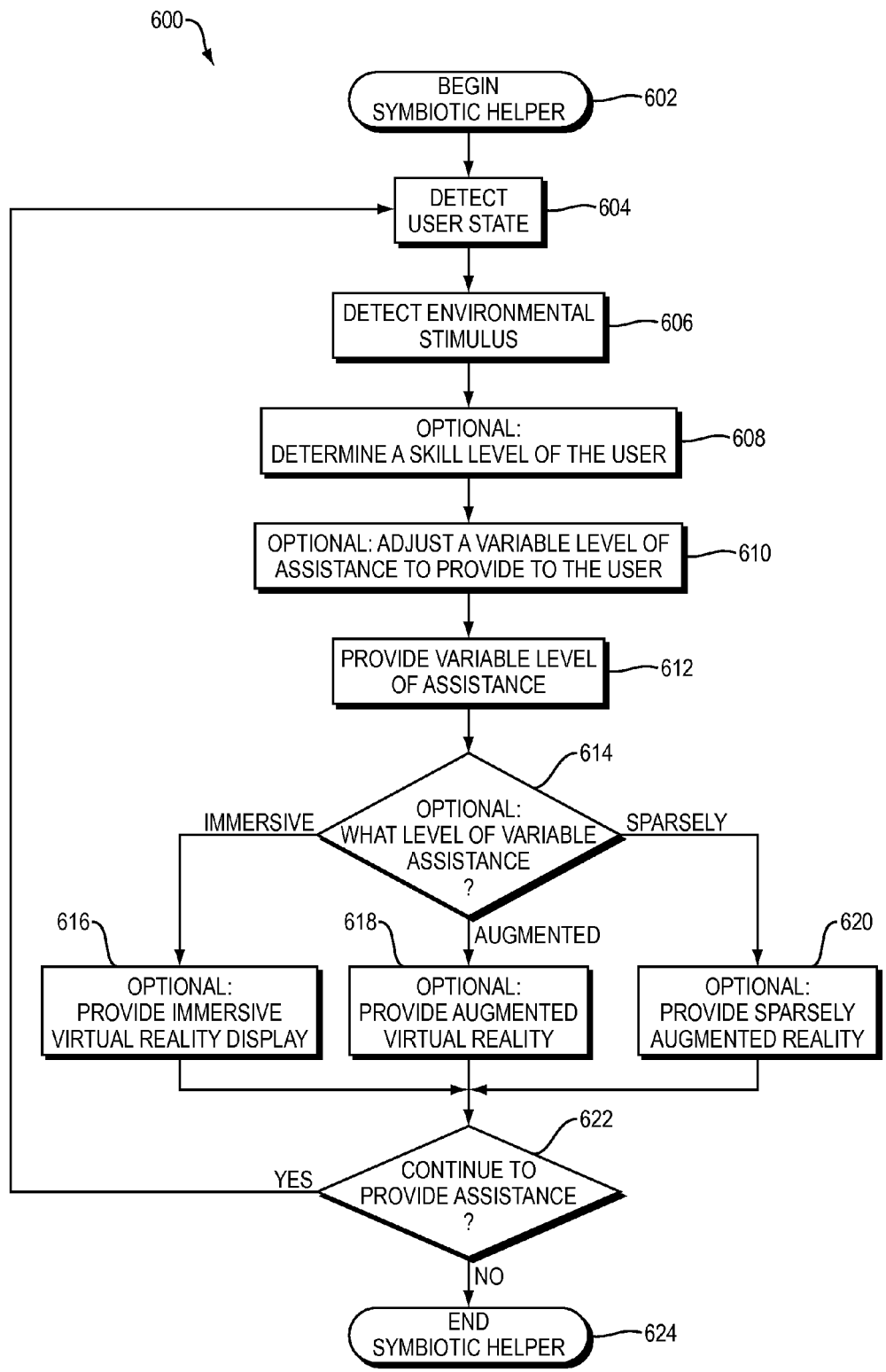
FIG. 6 is a flow diagram of an example embodiment of a process employed by the symbiotic helper.

FIG. 6 is a flow diagram of an example embodiment of a process 600 employed by the symbiotic helper 104 and executed by processor 316. The process 600 begins by starting the symbiotic helper (602). The symbiotic helper then detects a user state (604) using servers 314 and the like. The user state can be any attribute of the user that the symbiotic helper is using. For example, user state can be the direction the user is looking, a GPS location of the user, a user's vital signs, or a user's level of training. The symbiotic helper then detects environmental stimulus (606) using camera 308, microphone 310, detectors/sensors 312, 314. The environmental stimulus can be any stimulus of the environment of the user. Examples of environmental stimulus are visual stimulus 324, auditory stimulus 326, or olfactory stimulus 328, electromagnetic stimulus, physical stimulus, or a digital communication stimulus (generally other stimulus 330).

Optionally, the system 104 or process 600 determines a skill level of the user (608). Also optionally, the symbiotic helper 104 can adjust a variable level of assistance to provide to the user (610). The symbiotic helper 104, in this optional embodiment, adjusts the level of assistance to provide to the user based on the determined skill level of the user.

Next the symbiotic helper 104 provides a variable level of assistance to the user (612). Optionally, the system 104 or process 600 determines which level of variable assistance to provide to the user (614). If the system determines that the level of variable assistance is immersive, the system provides an immersive virtual reality display to the user (616) through display 318 and speaker 320 (FIG. 3). The immersive virtual reality display is a virtual reality that does not account for environmental stimulus, however, provides a controlled training environment where the user or trainee can learn an activity safely and efficiently. The immersive virtual reality display may include a 3D model (at 332) of the training environment as generated by processor 316. Common 3D modeling techniques are utilized.

If the system 104 or process 600 determines that the level of variable assistance is augmented, the system provides an augmented reality to the user (618) through display 318 and speaker 320. The augmented reality inputs environmental stimulus and displays them to the user, however also overlays a virtual reality onto the environment based on the level of assistance required to help the user with the task at hand. For example, the augmented reality can overlay functions (e.g., captions) of particular machines and buttons onto the respective machines and buttons.

Should the level of virtual assistance be sparsely, the symbiotic helper 104 provides a sparsely augmented reality (620) through display 318 and speaker 320. The sparsely augmented reality provides the display by just showing the environment as a starting point. The symbiotic helper builds on the view of the environment by overlaying detected stimulus on a need to know basis. For example, the sparsely augmented reality can show the user and environment, however alert the user to a dangerous circumstance, such as a gunshot, or cry for help. The sparsely augmented reality, along with the virtual reality and augmented virtual reality, can alert the user to inferences found in the environment as well. For example, using image analysis, the symbiotic helper 104 in sparsely augmented reality mode can direct the user's attention to a particular gauge of a machine that is either moving in a wrong direction or not moving when it should be.

Next the symbiotic helper 104 determines whether it should continue to provide assistance (622). Should the symbiotic helper determine it should not continue to provide assistance, for instance, should the user desire to turn the symbiotic helper off, the symbiotic helper ends (624). However, should the system determine that the symbiotic helper should continue to provide assistance, the system detects a user state (604) and repeats the steps 606-622.

Figure 7:
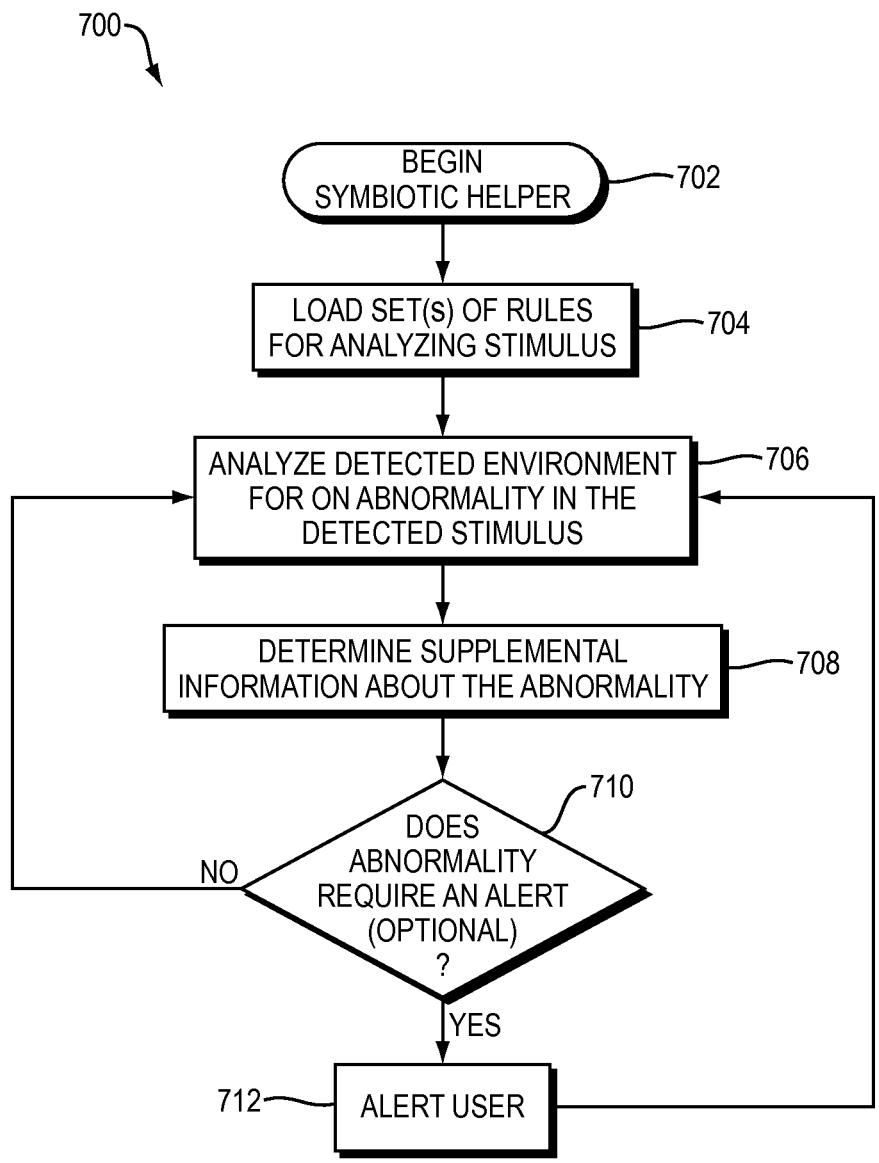
FIG. 7 is a flow diagram illustrating an example embodiment of a process employed by the symbiotic helper system.

FIG. 7 is a flow diagram 700 illustrating an example embodiment of a process employed by the symbiotic helper system 104 and processor 316. The process 700 begins by starting the symbiotic helper system (702). The symbiotic helper loads a set or sets of rules for analyzing stimulus (704). For example a set or sets of rules can include rules relating to image processing, or audio processing, or other processing of stimulus that is detected by the camera 308, microphone 310, other detectors 312/sensors 314 of symbiotic helper 104. The symbiotic helper then analyzes the detected environment for an abnormality in the detected stimulus (706). For example, while the symbiotic helper can easily detect a visual landscape surrounding the user by taking continual pictures using cameras 308, the user generally may desire to be alerted to particular stimulus from the visual environment. Therefore, the symbiotic helper 104 detects abnormalities from the detected stimulus 324, 326, 328, 330 (FIG. 3), in this example, the visual landscape, and alerts the user to the particular abnormalities (through speaker 320 and display 318 output). Otherwise, the user can be overwhelmed with unneeded information about his or her environment that he or she can determine without the symbiotic helper. Therefore, the symbiotic helper is of maximum utility when the visual landscape is analyzed for an abnormality, such as an explosion or other abnormality, and only the abnormalities are directed to the user's attention. A person of ordinary skill in the art can recognize that the concept of abnormalities and visual landscapes can be applied to any other type of stimulus, such as auditory, olfactory, electromagnetic, or other stimulants.

The symbiotic helper 104 then determines supplemental information about the abnormality (708). For example, upon determining there is an abnormality in the environment, the symbiotic helper can calculate supplemental information regarding the abnormality. Examples of supplemental information include what the abnormality is, the distance of the abnormality, a temperature of the abnormality (for example, of an explosion), or any other information that can be determined by processing the abnormality. Then, the symbiotic helper determines whether the abnormality requires an alert to be generated for the user, optionally (710). If the abnormality does require an alert to be generated to the user, the symbiotic helper generates and outputs an alert to the user (712). If the abnormality does not require an alert to be generated to the user, the symbiotic helper analyzes the protective environment for an abnormality in the detected stimulus again (706) and repeats the process steps 708, 710. Similarly, after generating an alert to the user, the symbiotic helper also analyzes the detected environment for an abnormality in the detected stimulus (706) and repeats the process steps 708, 710. A person of ordinary skill in the art can recognize that the symbiotic helper can analyze the detected stimulus for an abnormality (706) as soon as the symbiotic helper detects new stimulus. Likewise until the symbiotic helper system is turned off or disabled, the symbiotic helper system continuously analyzes the detected environment for any abnormality in the detected stimulus.

Figure 8:
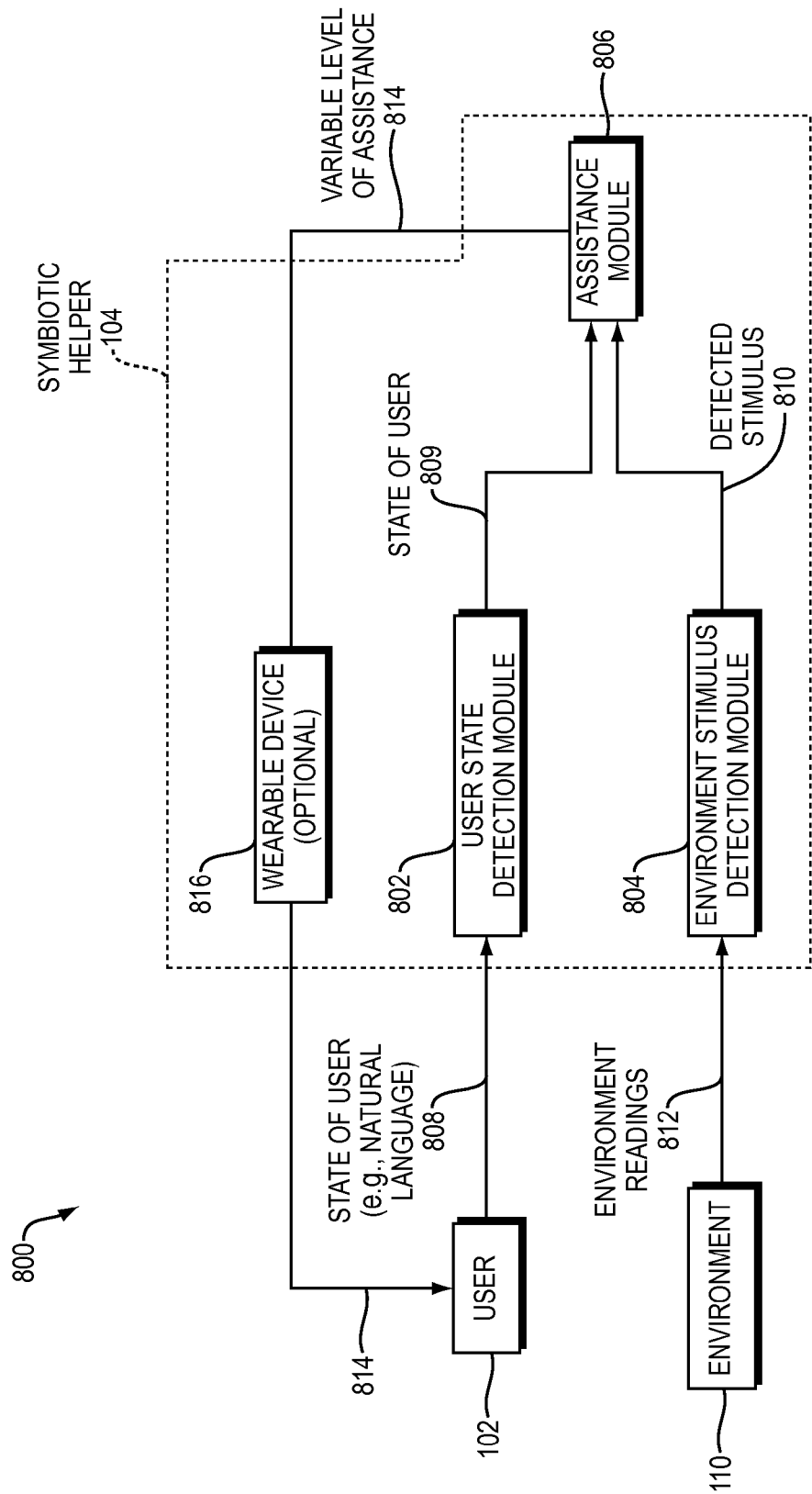
FIG. 8 is a block diagram of the symbiotic helper configured to interact with the user in one embodiment of the present invention.

FIG. 8 is a block diagram 800 of the symbiotic helper 104 configured to interact with the user 102. The symbiotic helper 104 includes the user state detection module 802, the environment stimulus detection module 804, and the assistance module 806. The user state detection module is configured to detect a state of the user 808 from the user 102. The state of the user 808 can be communicated, for example, by natural language spoken by the user. The user state detection 802 module returns indications of the state of the user 808 to the assistance module 806.

The environmental stimulus detection module 804 is configured to detect environment readings 812 from the environment 110. The environmental stimulus detection module 804 analyzes the environment readings 812 and returns a detected stimulus 810 to the assistance module 806.

The assistance module 806 is configured to receive the state of the user indications 809 from the user state detection module 802 and the detected stimulus 810 from the environment stimulus detection module 804. The assistance module 806 analyzes both the state of the user indications 809 and the detected stimulus 810. The assistance module outputs a variable level of assistance 814 to the user 102 through visual display 318 and speakers 320 (FIG. 3). In one embodiment, the assistance module 806 outputs the variable level of assistance 814 to an optional wearable device 816 of the symbiotic helper 104, which then provides the variable level of assistance 814 to the user 102. The variable level of assistance 814 may include user interactive 3D models 332 generated by processor 316. Common 3D model generation techniques and/or technology are employed.

Figure 9:
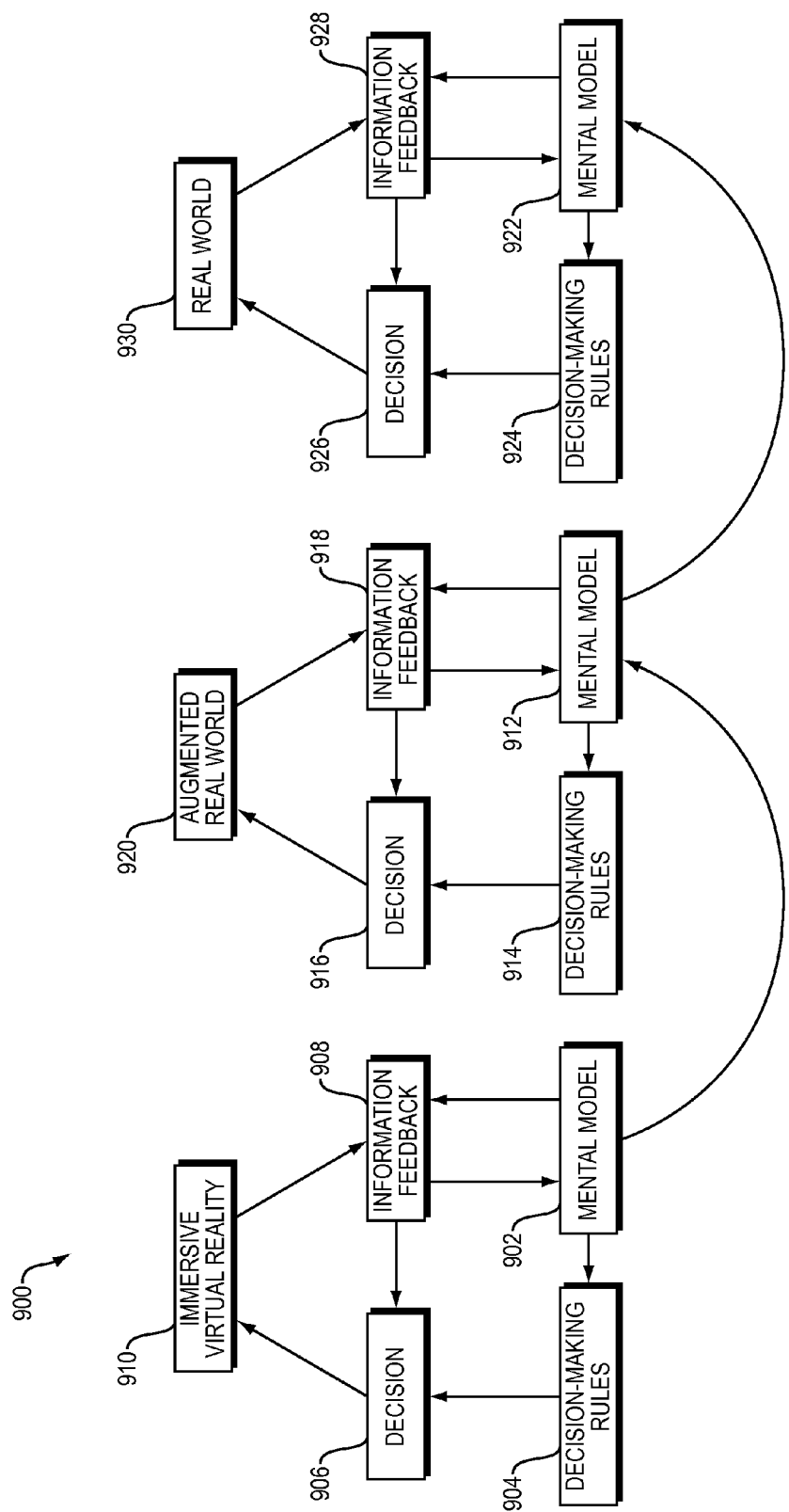
FIG. 9 is a flow diagram of an example embodiment of a process of a transfer of a mental model from an immersive virtual reality to an augmented real world to a real world.

FIG. 9 is a flow diagram 900 of an example embodiment of a process of a transfer of a mental model from an immersive virtual reality to an augmented real world to a real world.

A mental model explains a thought process of how something works in the real world. The mental model can be an understanding of its behavior (or set of governing rules), such as understanding how to drive a car, or understanding of how the car works, as a mechanic would understand the principles and the actual parts and systems constituting the car. Many activities are complex and mental models associated with the activities need to be developed. Immersive virtual reality environments and augmented reality environments facilitate this development without adverse consequences. The activities generally necessitate successive adjustments of the mental model until the activity can be performed properly. A double-loop learning process enables adjustment of the mental model from feedback of immersive virtual realities and augmented real world.

In one embodiment, a mental model 902 is first developed for use in an immersive virtual reality 900. After further developments and refinements in a succession of different environments (such as test environments), the mental model 902 can be used in a real world 930. The mental model 902 is transferred from each successive environment to the next environment (e.g., from the immersive virtual reality 910 to an augmented real world 920 to the real world 930).

The symbiotic helper 104 creates, clarifies, updates, or enhances decision-making rules 904 based on the mental model 902. The symbiotic helper 104 then sends a decision 906, based on decision-making rules 904, to the immersive virtual reality 910. The immersive virtual reality 910 creates information feedback 908 based on the effects of the decision 906 in the immersive virtual reality 910 and the mental model 902. Future decisions 906 are then based on the information feedback 908 in addition to the decision-making rules 904. Further, the information feedback 908 adjusts the mental model 902 based on the effects of the decision 906 in the immersive virtual reality 910.

The symbiotic helper 104 can copy the mental model 902 to a mental model 912 to be used with an augmented real world 920, for example, after a mental model training period is complete. The symbiotic helper 104 creates, clarifies, updates, or enhances decision-making rules 914 based on the mental model 912. The symbiotic helper 104 then sends a decision 916, based on decision-making rules 914, to the augmented real world 920. The augmented real world 920 creates information feedback 918 based on the effects of the decision 916 in the augmented real world 920 and the mental model 912. Future decisions 916 are then based on the information feedback 918 in addition to the decision-making rules 914. Further, the information feedback 918 adjusts the mental model 912 based on the effects of the decision 916 in the augmented real world 920.

The symbiotic helper 104 can copy the mental model 912 to a mental model 922 to be used with a real world 930, for example, after a mental model training period is complete. The symbiotic helper 104 creates, clarifies, updates, or enhances decision-making rules 924 based on the mental model 922. The symbiotic helper 104 then sends a decision 926, based on decision-making rules 924, to the real world 930. The real world 930 creates information feedback 928 based on the effects of the decision 926 in the real world 930 and the mental model 922. Future decisions 926 are then based on the information feedback 928 in addition to the decision-making rules 924. Further, the information feedback 928 adjusts the mental model 922 based on the effects of the decision 926 in the real world 930.

In another embodiment, the symbiotic helper 104 can create content within the immersive virtual reality. The symbiotic helper 104 can then provide the created, or authored, content in at least the immersive virtual reality 910, or augmented real world 920.

Figure 10:
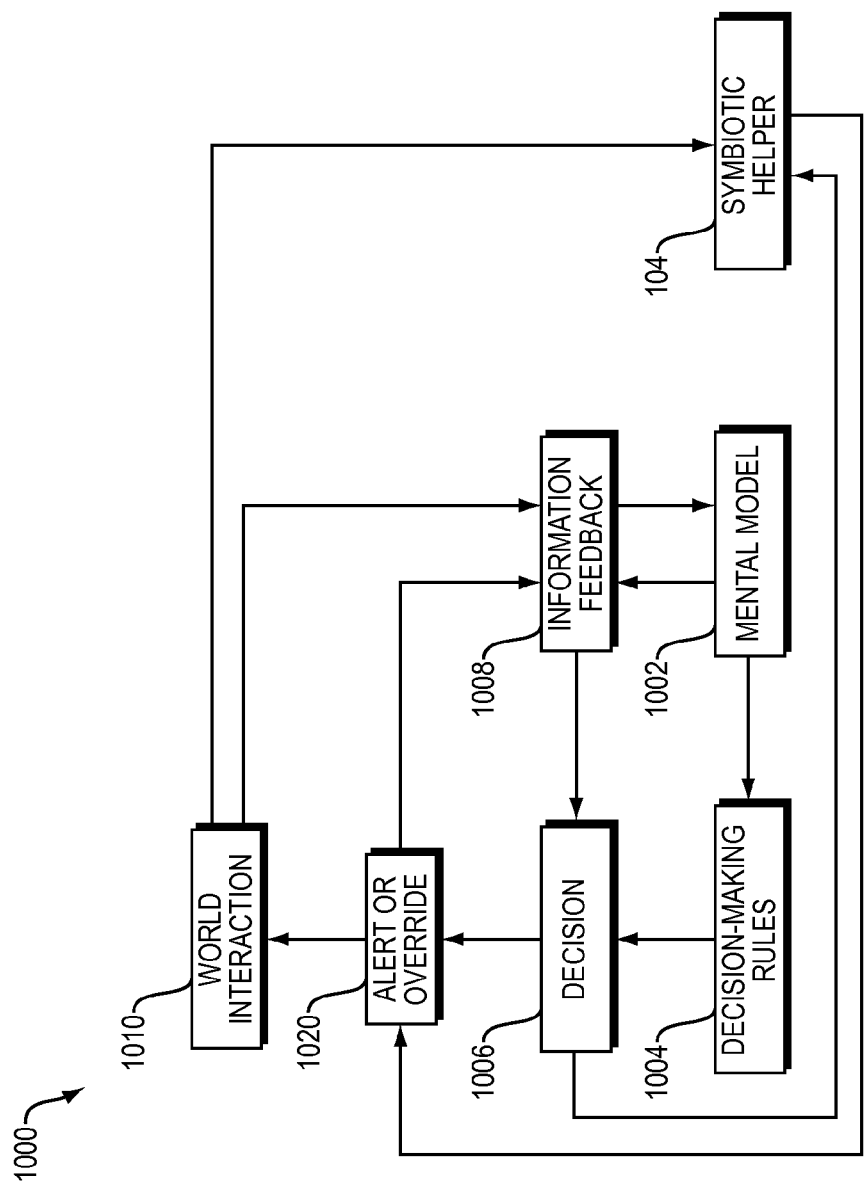
FIG. 10 is a flow diagram of an example process employed by the symbiotic helper of operating pre-interaction from the trainee.

FIG. 10 is a flow diagram 1000 of an example process employed by the symbiotic helper of operating pre-interaction from the trainee. In a pre-interaction role, the symbiotic helper 104 is employed to generate an 'alert or override' 1020 and provide information feedback 1008, which is used to influence decisions 1006 and create, clarify, update, or enhance a mental model 1002. For example, the mental model 1002 can generate a decision 1006 based on decision-making rules 1004. The decision is interpreted by the symbiotic helper 104. Upon an alert threshold or override threshold being met, the symbiotic helper 104 generates an alert or override 1020. The alert or override 1020 is sent to the world interaction 1010 (e.g., immersive virtual reality 910, augmented real world 920, and real world 930) to generate an alert to the user or override the decision 1006. The alert or override 1020 also modifies the information feedback 1008, which further modifies the mental model 1002 and the decision 1006.

If the symbiotic helper 104 does not determine that an alert threshold or an override threshold is met, however, the decision 1006 is sent directly to the world interaction 1010 without any alert or override 1020.

Figure 11:
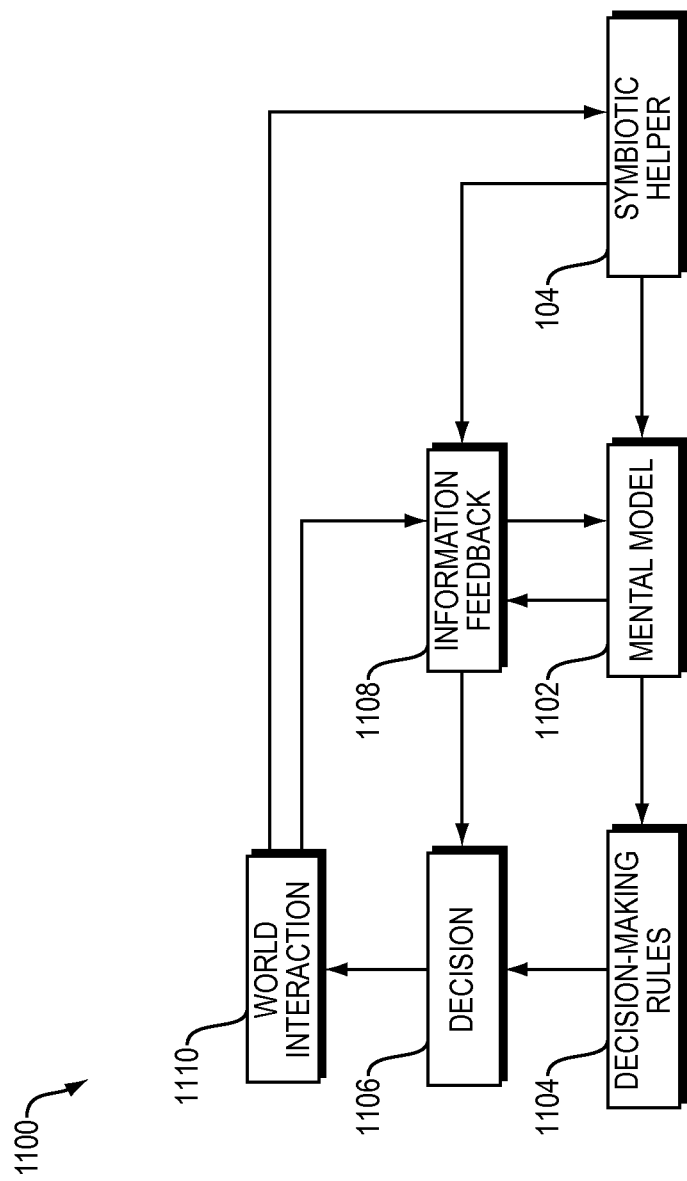
FIG. 11 is a flow diagram of an example process employed by the symbiotic helper of operating post-interaction from the trainee.

FIG. 11 is a flow diagram 1100 of an example process employed by the symbiotic helper of operating post-interaction from the trainee. In the post-interaction role, the symbiotic helper 104 does not issue an alert or override (e.g., alert or override 1020). Instead, based on the interaction with the trainee, the symbiotic helper 104 modifies a mental model 1102. For example, the mental model 1102 can generate a decision 1102 based on decision-making rules 1104. The decision 1106 is sent to world interaction 1110 (e.g., immersive virtual reality 910, augmented real world 920, and real world 930). Then, world interaction updates the information feedback 1108 and the symbiotic helper 104. The information feedback 1108 thereby updates the mental model 1102, and the symbiotic helper 104 bases its next decision upon the updated world interaction 1110

Post-interaction feedback is typically used in real world situations because errors in virtual worlds have less adverse consequences. In post-interaction mode, the symbiotic helper 104 provides additional feedback to the trainee including an explanation about possible improvements and mistakes for the trainee to correct.

The symbiotic helper 104 creates, clarifies, updates, or enhances a user mental model (e.g., 902, 912, 922, 1002, 1102) of the trainee which evolves over time by accumulating data about the trainee. The user mental model (e.g., 902, 912, 922, 1002, 1102) has physical characteristics and mental characteristics. The mental characteristics are derived from behaviors of the trainee during domain specific trainings he has performed or is performing in the virtual environments. Physical characteristics are derived from user entry, detection of user movements, or an automated physical characteristic detection process.

Individuals can make a same mistake repeatedly. For example, an individual may act before completely observing his or her environment, or before clearly understanding a nature of a problem to solve. This tendency can be detected by a low time spent in the demo phase, a longer time in the interactive learning phase, and/or low-to-average scores in the testing phase. Such a tendency does not prevent intelligent or experienced individuals for the domain specific training from passing with high scores with low times spent in both demo and interactive learning phases. Mistakes that are corrected during the learning phase that are corrected during that phase tend to have a high and durable retention with the trainee. Test scores of different learning methods can further determine which learning methods the trainee responds to most effectively and can further track the effectiveness of verbal, visual and other stimuli in the training process.

Embodiments or aspects of the present invention may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein. Modules may be implemented in the form of hardware with the processor(s) coupled with other hardware elements.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-based method comprising:
   by one or more computer processors:
   detecting, by at least one sensor, a stimulus in an environment of a user, the stimulus including at least one of visual stimulus, auditory stimulus, olfactory stimulus, temperature stimulus, electromagnetic stimulus, biological stimulus, and location stimulus;
   detecting one or more attributes of the user including vital signs of the user from a biological sensor, a level of training of the user from a database, a line of sight of the user to the stimulus in the environment from an electromagnetic sensor, or a location of the user within the environment relative to the stimulus from a global positioning (GPS) sensor; and
   responsive to the detected stimulus, providing, on a head-mounted display housing the at least one sensor worn by the user, a variable level of assistance to the user based on the detected one or more attributes of the user and the detected stimulus in the environment by loading from a training database stored in a memory a training technique corresponding to the variable level of assistance based on the detected one or more attributes of the user, a determined level of skill of the user, and the detected stimulus in the environment, wherein providing the variable level of assistance comprises training the user to require a lower level of assistance, and further by capturing a log including controls selected by the user in a virtual environment presented on the head-mounted display, and based on the captured log, determining the variable level of assistance.

2. The computer-based method of claim 1, wherein detecting the stimulus in the environment of the user comprises detecting at least one of a visual stimulus, an auditory stimulus, a physical stimulus, a vibratory stimulus, an electro-magnetic stimulus, an olfactory stimulus, a temperature stimulus, and a movement stimulus.

3. The computer-based method of claim 1, wherein detecting the one or more attributes of the user comprises detecting natural language spoken by the user.

4. The computer-based method of claim 1, further comprising:
   determining a level of skill of the user; and
   adjusting the variable level of assistance based on the determined level of skill.

5. The computer-based method of claim 1, wherein providing a variable level of assistance comprises:
   providing an immersive virtual reality at a display for a first level of assistance;
   providing an augmented virtual reality for a second level of assistance; and
   providing a sparsely augmented reality for a third level of assistance.

6. The computer-based method of claim 5, further comprising alerting the user to the detected stimulus in the environment in the immersive virtual reality, augmented virtual reality, or sparsely augmented reality.

7. The computer-based method of claim 5, further comprising authoring content within the immersive virtual reality, wherein providing variable levels of assistance further provides the authored content.

8. The computer-based method of claim 1, wherein providing a variable level of assistance to the user comprises providing personal safety training or team safety training.

9. The computer based method of claim 1, wherein the log are digital footprints, and wherein providing a variable level of assistance to the user comprises analyzing digital footprints of the user to determine a level of proficiency and modifying provided variable level of assistance based on the determined level of proficiency.

10. The computer-based method of claim 1, further comprising alerting the user to positive and negative inferences determined from the detected stimulus.

11. The computer-based method of claim 1, further comprising providing instructions to the user based on a risk assessment of the detected environment.

12. The computer-based method of claim 1, further comprising:
   identifying an abnormality in the detected stimulus;
   determining supplemental information about the abnormality; and
   alerting the user of the presence of the abnormality and the determined supplemental information.

13. A system comprising:
   a processor; and
   a memory with computer instructions stored therein, the memory operatively coupled to said processor such that the computer instructions configure the processor to implement:
   detecting, by at least one sensor, a stimulus in an environment of the user, the stimulus including at least one of visual stimulus, auditory stimulus, olfactory stimulus, temperature stimulus, electromagnetic stimulus, biological stimulus, and location stimulus; and
   detecting attributes of the user including one or more vital signs of the user from a biological sensor, a level of training of the user from a database, a line of sight of the user to the stimulus in the environment from an electromagnetic sensor, or a location of the user within the environment relative to the stimulus from a global positioning (GPS) sensor; and
   responsive to the detected stimulus, providing, on a head-mounted display housing the at least one sensor worn by the user, a variable level of assistance to the user based on the detected one or more attributes of the user and the detected stimulus in the environment by loading from a training database stored in a memory a training technique corresponding to the variable level of assistance based on the detected one or more attributes of the user, a determined level of skill of the user, and the detected stimulus in the environment, the assistance module further configured to train the user to require a lower level of assistance, and further by capturing a log including controls selected by the user in a virtual environment presented on the head-mounted display, and based on the captured log, determining the variable level of assistance.

14. The system of claim 13, wherein detecting the stimulus further includes detecting at least one of a visual stimulus, an auditory stimulus, a physical stimulus, a vibratory stimulus, an electro-magnetic stimulus, an olfactory stimulus, a temperature stimulus, and a movement stimulus.

15. The system of claim 13, wherein detecting attributes of the user further includes detecting natural language spoken by the user.

16. The system of claim 13, wherein the processor is further configured to:
determine a level of skill of the user; and
adjust the variable level of assistance based on the determined level of skill.

17. The system of claim 13, wherein the processor is further configured to:
provide an immersive virtual reality at a display for a first level of assistance;
provide an augmented virtual reality for a second level of assistance; and
provide a sparsely augmented reality for a third level of assistance.

18. The system of claim 17, further comprising alerting the user to the detected stimulus in the environment in the immersive virtual reality, augmented virtual reality, or sparsely augmented reality.

19. The system of claim 17, wherein the processor is further configured to author content within the immersive virtual reality, wherein the assistance module is further configured to provide the authored content.

20. The system of claim 13, wherein the processor is further configured to provide personal safety training or team safety training.

21. The computer based method of claim 13, wherein the captured log are digital footprints, and wherein providing a variable level of assistance to the user includes analyzing digital footprints of the user to determine a level of proficiency and modifying provided variable level of assistance based on the determined level of proficiency.

22. The system of claim 13, wherein the processor is further configured to alert the user to positive and negative inferences determined from the detected stimulus.

23. The system of claim 13, wherein the processor is further configured to provide instructions to the user based on a risk assessment of the detected environment.

24. The system of claim 13, wherein the processor is further configured to:
identify an abnormality in the detected stimulus;
determine supplemental information about the abnormality; and
alert the user of the presence of the abnormality and the determined supplemental information.

25. An apparatus comprising:
a memory area configured to store preset levels of assistance to a user;
a processor coupled to said memory area, said processor configured to:
detect, by at least one sensor, a stimulus in an environment of the user, the stimulus including at least one of visual stimulus, auditory stimulus, olfactory stimulus, temperature stimulus, electromagnetic stimulus, biological stimulus, and location stimulus;
detect attributes of the user including one or more vital signs of the user from a biological sensor, a level of training of the user from a database, a line of sight of the user to the stimulus in the environment from an electromagnetic sensor, or a location of the user within the environment relative to the stimulus from a global positioning (GPS) sensor, and defining the detected as a state of the user;
responsive to the detected stimulus, provide, at a head-mounted display worn by the user, at least one of the preset levels of assistance to the user based on the detected one or more attributes of the user and the detected stimulus in the environment by loading from a training database stored in a memory a training technique corresponding to the variable level of assistance based on the detected one or more attributes of the user, a determined level of skill of the user, and the detected stimulus in the environment, said providing by the processor including training the user to require a lower level of assistance, and further by capturing a log including controls selected by the user in a virtual environment presented on the head-mounted display, and based on the captured log, determining the variable level of assistance; and
a wearable module including at least one of a display and a speaker configured to provide the at least one of the preset levels of assistance to the user.

* * * * *